United States Patent [19]

Karmann et al.

[11] 3,816,892

[45] June 18, 1974

[54] TAPERED TUBE BURNISHING MACHINE

[75] Inventors: Thomas R. Karmann, Omaha; Alton T. Adams, Arlington, both of Nebr.

[73] Assignee: Valmont Industries, Inc., Valley, Nebr.

[22] Filed: Oct. 20, 1972

[21] Appl. No.: 299,254

[52] U.S. Cl. ................................................. 29/90 R
[51] Int. Cl. ............................................. B24b 39/04
[58] Field of Search ................... 29/90; 72/190, 191

[56] References Cited
UNITED STATES PATENTS

| 426,526 | 4/1890 | Coram | 29/90 |
|---|---|---|---|
| 2,352,726 | 7/1944 | Maulding | 29/90 |
| 2,565,780 | 8/1951 | Offutt | 72/190 |
| 3,382,696 | 5/1968 | Martelle | 72/190 |

FOREIGN PATENTS OR APPLICATIONS

| 270,772 | 8/1970 | U.S.S.R. | 29/90 R |

*Primary Examiner*—Donald R. Schran
*Assistant Examiner*—W. R. Briggs
*Attorney, Agent, or Firm*—Henderson and Strom

[57] ABSTRACT

A burnishing machine for a tapered tube which holds the tube in place on a mandrel while also rotating the tube about its longitudinal axis, and wherein a pair of vertically spaced endless chains are provided which carry burnishing units traveling longitudinally of and in contact with the rotating tube, and with the upper burnishing chain unit hydraulically vertically movable relative to the lower burnishing chain unit for accommodating any normal taper of the tube, and further with the burnishing units spring loaded for coaction with the hydraulically loaded upper chain unit to obtain floating burnishing action against the tube.

9 Claims, 15 Drawing Figures

TAPERED TUBE BURNISHING MACHINE

BACKGROUND OF THE INVENTION

The only known prior device for burnishing tapered tubes comprised an elongated pit into which a tube was literally dumped onto a plurality of longitudinally spaced rollers. After the insertion of a mandrel into the tube, which also provided rotation for the tube about its longitudinal axis, a plurality of burnishing roller units mounted on a pair of sprocket driven chains were rotated longitudinally of the tube. The chains were each rotatably mounted in a plane which extended outwardly and upwardly from the tube rollers at a very small acute angle with the horizontal.

Disadvantages with this arrangement included the dropping of the tube which could and did damage many parts; inability to handle but a small taper due to the angular inclination of the sprockets; inability to properly service the bearing hubs of the sprockets; a critical location of the mandrel within the tube as the sprocket and chain arrangements were fixed; and further a need for continually replacing certain parts of the burnishing units due to their fixed nature.

SUMMARY OF THE INVENTION

A machine for burnishing a hollow, tapered tube carried centrally thereof comprising a frame; a first pair of sprockets driving an endless chain mounted in a vertical plane on the frame, and carrying in a pair of vertically spaced horizontally disposed trains a plurality of burnishing units which engage the tube while moving along the upper train; a secondary frame assembly vertically movable in the main frame above the tube; a second pair of sprockets driving an endless chain mounted in a vertical plane on the secondary frame, and also carrying in a pair of vertically spaced horizontally disposed trains another plurality of burnishing units which engage the tube while moving along the lower train; a power source for driving the pairs of sprockets; and a mandrel movable into and out of engagement within the tube for locating the tube between the upper and lower trains and providing a backstop within the tube against which the burnishing units work as they frictionally engage the outer surface of the tube; and further wherein the secondary frame assembly is movable out of a horizontal plane to tailor fit the tapered tube between the upper and lower burnishing units, placing the burnishing units in spring compression against the tube.

DESCRIPTION OF THE PREFERRED EMBODIMENT

Figure 1:
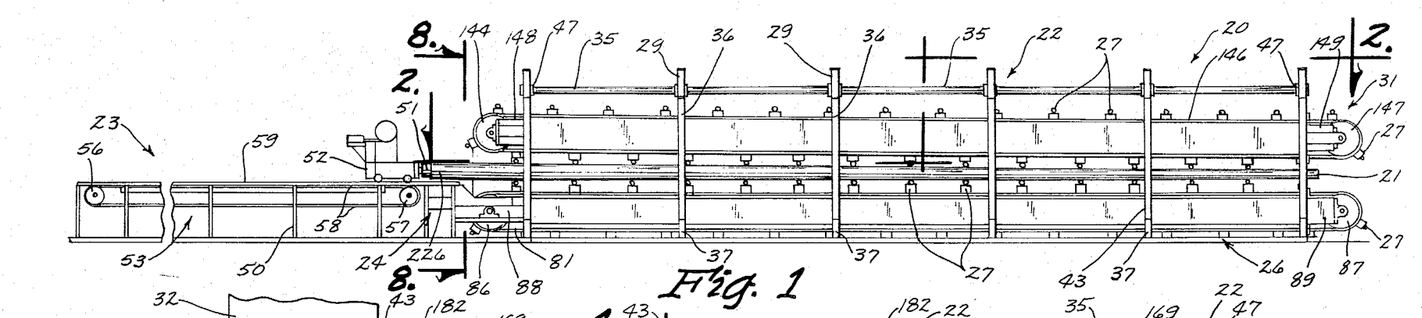
FIG. 1 is a side elevational view of a preferred embodiment of the burnishing machine of this invention.
Figures 2, 3, 3A:
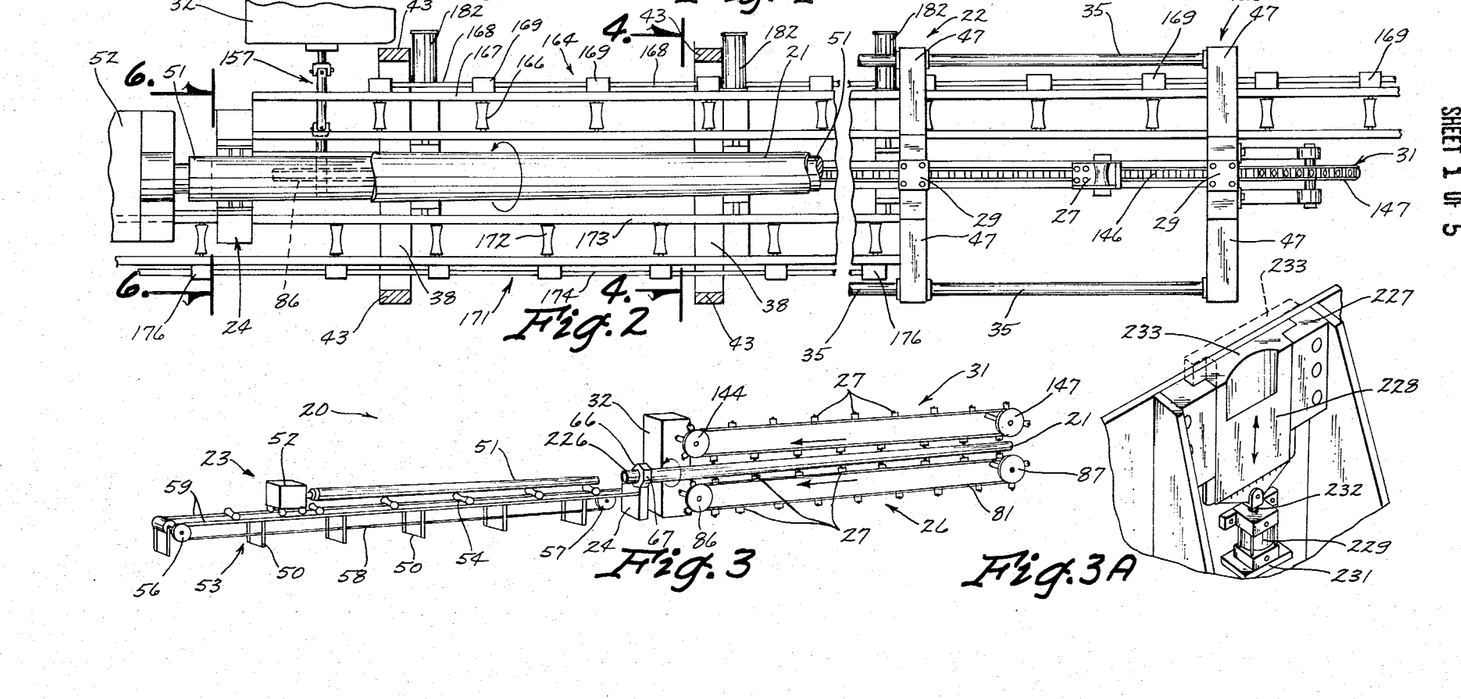
FIG. 2 is an enlarged, fragmentary plan view and partly in section, of the burnishing machine as seen along the line 2—2 in FIG. 1.
FIG. 3 is a schematic perspective view of the burnishing machine.
FIG. 3A is an enlarged fragmentary, perspective view of a detail of the machine.

Referring now to the drawings, particularly FIG. 1, a preferred embodiment of the burnishing machine of this invention is illustrated generally at 20 in FIG. 1, and which machine 20 is operable to burnish a hollow tapered tube 21 (FIGS. 1 and 2), and shown in schematic in FIG. 3.

Generally, the burnishing machine of this invention comprises a frame assembly 22, a mandrel conveyor group 23 (FIG. 3), a tube clamping device 24 (FIG. 1), a lower stationary burnishing assembly 26 (FIG. 1), a plurality of burnishing units 27 (FIGS. 4 and 5), a secondary frame assembly 28 (FIG. 4) movably mounted within the frame assembly 22, and moved by a unit 29 mounted on the frame assembly 22, an upper burnishing assembly 31 (FIG. 1) also carrying a plurality of burnishing units 27, and a drive unit 32 mounted at one end and to the side (FIG. 8) of the frame assembly 22 for imparting drive to the upper end lower burnishing assemblies 31 and 26, respectively.

Figures 4, 5:
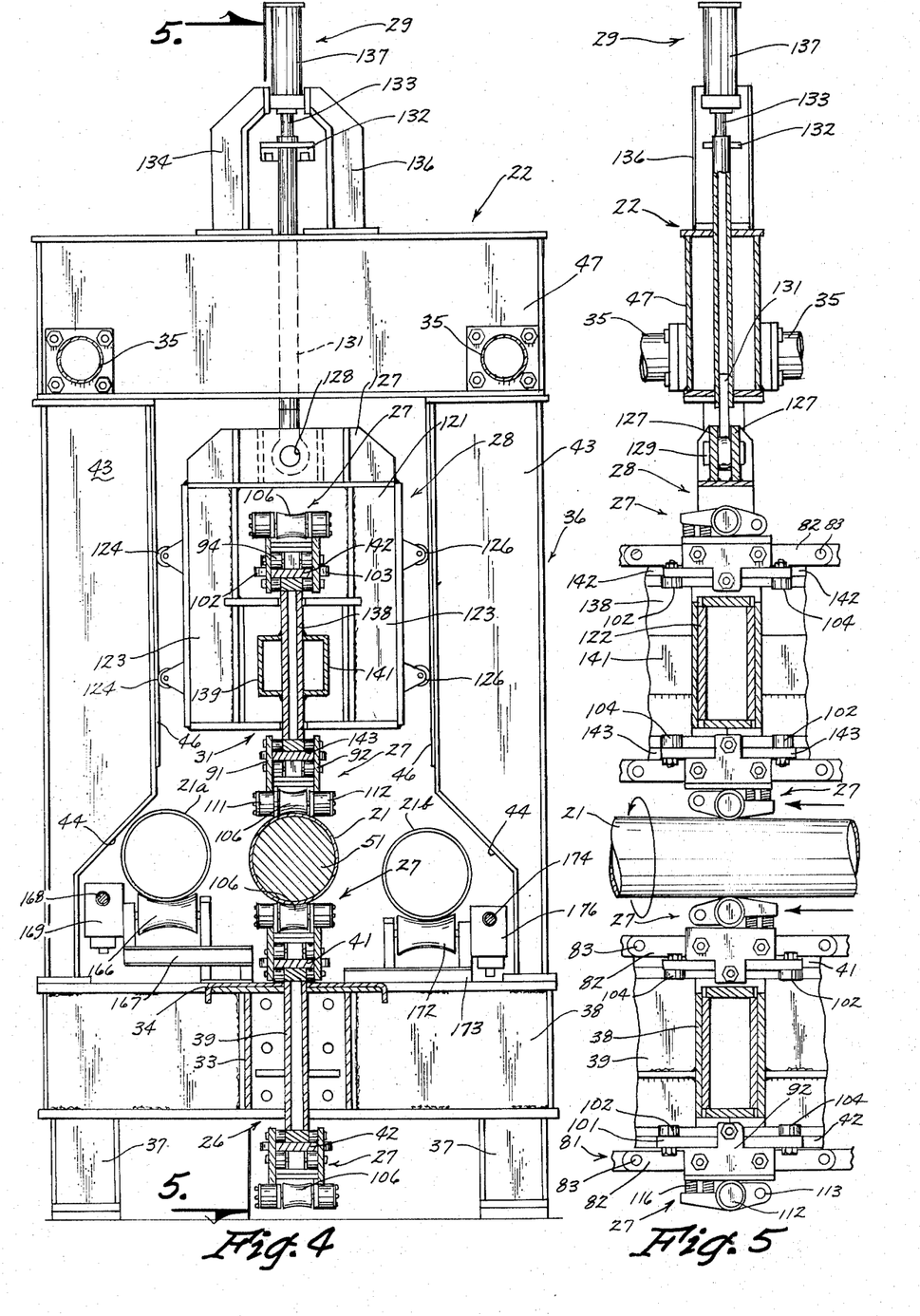
FIG. 4 is an enlarged, vertical sectional view of the entire machine taken along the line 4—4 in FIG. 2.
FIG. 5 is a vertical sectional view as taken along the line 5—5 in FIG. 4.

More specifically, the frame assembly 22 includes a plurality of upright frame sections 36 shown in horizontally spaced relationship in FIGS. 1 and 4, and with each upright frame section 36 comprising a pair of laterally spaced legs 37 (FIG. 4) upon which a transverse box-shaped support 38 is mounted. Longitudinally of the frame section an inverted U-shaped support 33, covered by a table 34, extends, beneath which a narrow box frame 39 (FIG. 4) extends with a flat upper roll plate 41 and a flat lower roll plate 42 being provided for the lower burnishing assembly 26, and with the box support 38 (FIG. 5) extending laterally outwardly from either side of the longitudinal box frame 39, the outer ends of which rest upon the base legs 37 (FIG. 4).

Extending upwardly from the transverse support 38 are a pair of side members 43 (FIG. 4) each being provided near the base thereof with a cut-away area 44, and the inner sides of which have mounted thereon a pair of roll plates 46 each extending in a vertical plane. A top support member 47 extends across the upper ends of the upright side members 43 for completing the upright frame section 36.

In addition to the frame sections 36 being interconnected by the elongated support 33 (FIG. 4) which extends the entire length of the machine 20, they are also interconnected at their upper ends by a pair of parallel tubes 35 (FIG. 4).

Referring particularly to FIGS. 1 and 3, the mandrel conveyor group 23 functions to move an elongated, solid mandrel 51 into and out of the tube 21 for providing a backstop within the tube 21 against which the burnishing units 27 work to burnish the tube 21 which is supported by the tapered configuration of the mandrel 51. The mandrel 51 is tapered (See FIGS. 2 and 3) from a smaller diameter at its end closest to the tube clamping device 24 (FIG. 3) to a larger diameter at the opposite end closest to the propelling cart 52; and the amount of taper is of course a matter of choice. A cart support or table 53 is provided with a plurality of box legs 50, and upon which a plurality of longitudinally spaced rollers 54 are mounted for receiving the mandrel 51. A pair of sprockets 56, 57 (FIG. 3) are mounted each at one end of the table 53, and about which a chain 58 is trained for pulling the cart 52, the wheels of which are mounted on a pair of parallel tracks 59. The cart 52 is a self contained unit which provides power to propel itself and to rotate the mandrel 51.

Figures 6, 7:
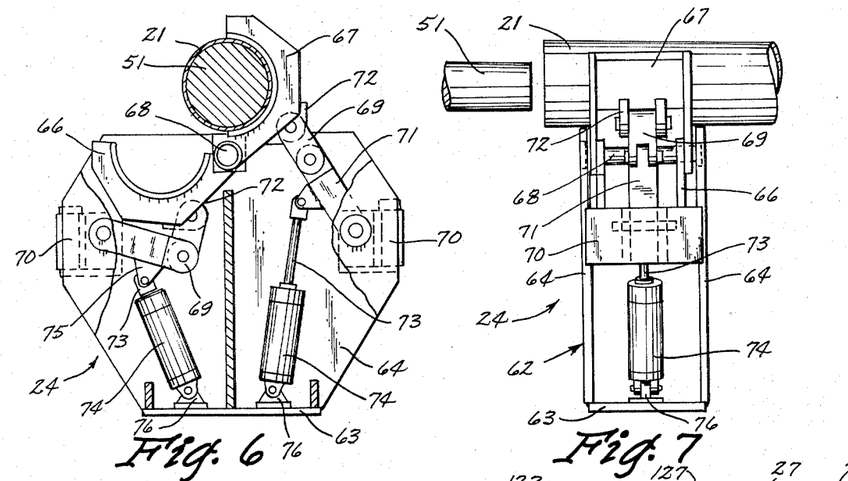
FIG. 6 is an enlarged vertical sectional view of the tube clamp unit as taken along the line 6—6 in FIG. 2.
FIG. 7 is a fragmentary side elevational view of the structure of FIG. 6.

At the end of the mandrel table 53 adjacent an end of the frame assembly 22 as best illustrated in FIG. 1, a clamp device 24 is located, which device includes a housing 62 (FIGS. 6 and 7) having a base 63 and a pair of side pieces 64. A pair of clamping jaws 66, 67 are mounted on a common pivot 68 at the top of the housing 62, the pivot 68 extending into the side pieces 64; with each jaw 66, 67 having an articulated linkage device 69, 71, one end of which is connected to an ear 72 on a jaw, and the other end of which is connected to a bracket 70 secured between the side pieces 64. An ear 75 on one of the links of each linkage device 69 and 71 is pivotally connected to the end of a piston 73 of a hydraulic cylinder 74 pivotally mounted on a block 76 on the base 63 of the housing 62. It may readily be appreciated as illustrated in FIG. 6, that operation of the pair of cylinders 74 provides either a clamping of the jaws 66, 67 over the tube 21, within which is inserted the mandrel 51, or effects a removal of the jaws 66, 67 therefrom, the jaws moving downwardly to a position within the housing 62.

The lower stationary burnishing assembly 26 comprises an endless chain 81 (FIGS. 3 and 5), which chain includes a plurality of parallel links 82 joined by rollers 83 in a conventional manner. The burnishing units 27 (FIG. 3) are mounted on a chain 81 in longitudinally spaced relationship, with the chain 81 being trained over a pair of horizontally spaced sprockets 86 and 87 rotatably mounted on the frame assembly 22 by mounting blocks 88, 89 which provide for varying the tension on the chain 81 in a conventional manner (See FIG. 1).

Figure 13:
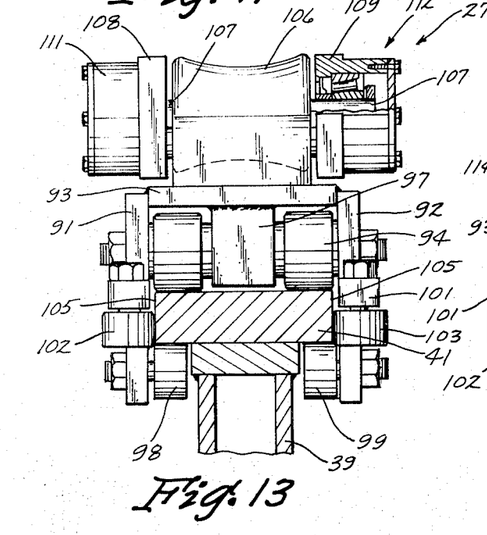
FIG. 13 is an enlarged vertical detail view of a burnishing unit, with certain parts broken away and others shown in section for clarity of illustration.
Figure 14:
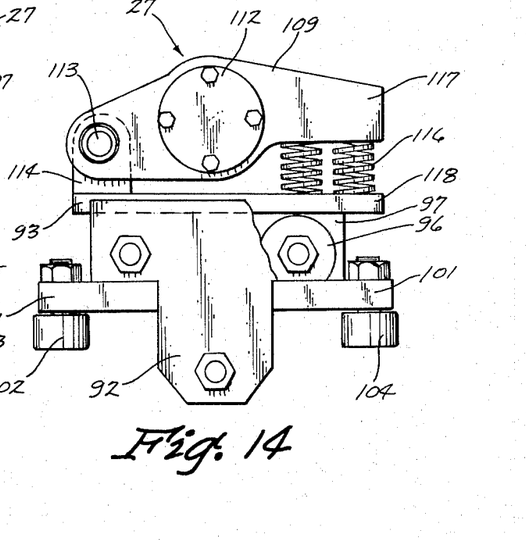
FIG. 14 is a side elevational view of the burnishing unit alone of FIG. 13.

Referring particularly FIGS. 13 and 14, each burnishing unit 27 comprises a pair of upright, parallel side plates 91, 92 interconnected by a top plate 93, and with a pair of rollers 94, 96 being mounted fore and aft of the side plates for engagement with either the upper roll plate 41, as shown in FIG. 13, or the lower roll plate 42, as shown in FIG. 4. The rollers 94 and 96 are rotatably mounted on a center piece 97 which depends from the top plate 93. An additional pair of rollers mounted about a horizontal axis are illustrated at 98 and 99 in FIG. 13 for engaging the underside of either the upper roll plate 41, or the upper surface of the lower roll plate 42 as is best illustrated in FIG. 5. Additionally, a pair of end plates 101 extend longitudinally outwardly from each end of the side plates 91, 92, with each having a pair of side rollers 102 and 103 mounted on a vertical axis at each end, the four side rollers engaging the respective sides 105 of the roll plates 41 and 42.

On the top plate 93, a tube burnishing roll 106 of an hourglass configuration is rotatably mounted about a horizontal axis, the journal 107 therefor inserted into a pair of upright side plates 108 and 109, and with the journals 107 extending outwardly further into roller bearing mounting units 111 and 112. The side plates 108 and 109 are interconnected by a transverse pivot 113 secured on a mounting bracket 114, and with a quartet of springs 116 inserted between the free end 117 of the side plates 108, 109 and the top plate portion 118 below, and retained to the end 117 by bolts (not shown). By this arrangement, the tube burnishing roller 106 is continually biased against the tube 21 by the springs 116.

Referring particularly to FIGS. 4 and 5, the secondary frame assembly 28 includes a relatively square frame 121 which has a rectangular lower unit 122, shown in cross section in FIG. 5, and upon which a pair of side members 123 are mounted, each side member having a pair of vertically spaced rollers 124, 126 mounted externally thereon for contact with the roll plates 46 of the frame assembly 22. A pair of parallel top members 127 (FIG. 5) interconnect the upper ends of the side members 123, each of which is provided at its center with an opening 128 for receiving a pin 129 interconnecting the frame 121 with the secondary frame pressure or moving unit illustrated generally at 29.

The pressure moving unit 29 comprises a depending rod 131 connected with the pin 129, and with the upper end having a connection 132 with the exposed end of a piston rod 133, the rod being part of a cylinder 137 mounted by a pair of brackets 134, 136 on the upper surface of the top support member 47 of the frame assembly 22. A narrow box frame 138 being comparable to the box frame 39 (FIG. 4) for the lower burnishing assembly 26. Additionally, an upper roll member 142 and a lower roll member 143 are provided at the upper and lower ends of the box frame 138 for receiving and guiding the burnishing unit rollers 106 as described herein before.

The upper burnishing assembly 31 (FIG. 3) comprises an endless chain 146 (FIG. 1) identical to the chain 81 of the lower assembly 26, and which chain 146 also includes a plurality of links 82 joined by rollers 83 (FIG. 5) in a conventional manner. A like plurality of burnishing units 27 (FIG. 1) are mounted on the chain 146 in longitudinally spaced relationship identical to the burnishing units 27 on the lower chain 81, and with the chain 146 being trained over a pair of horizontally spaced sprockets 144 and 147 (FIG. 1) rotatably mounted on the upper frame assembly frame 121 at the drive end and the opposite end of the machine 20, respectively, by mounting blocks 148 and 149 (FIG. 1), which blocks provide for varying the tension on the chain 146.

Figure 8:
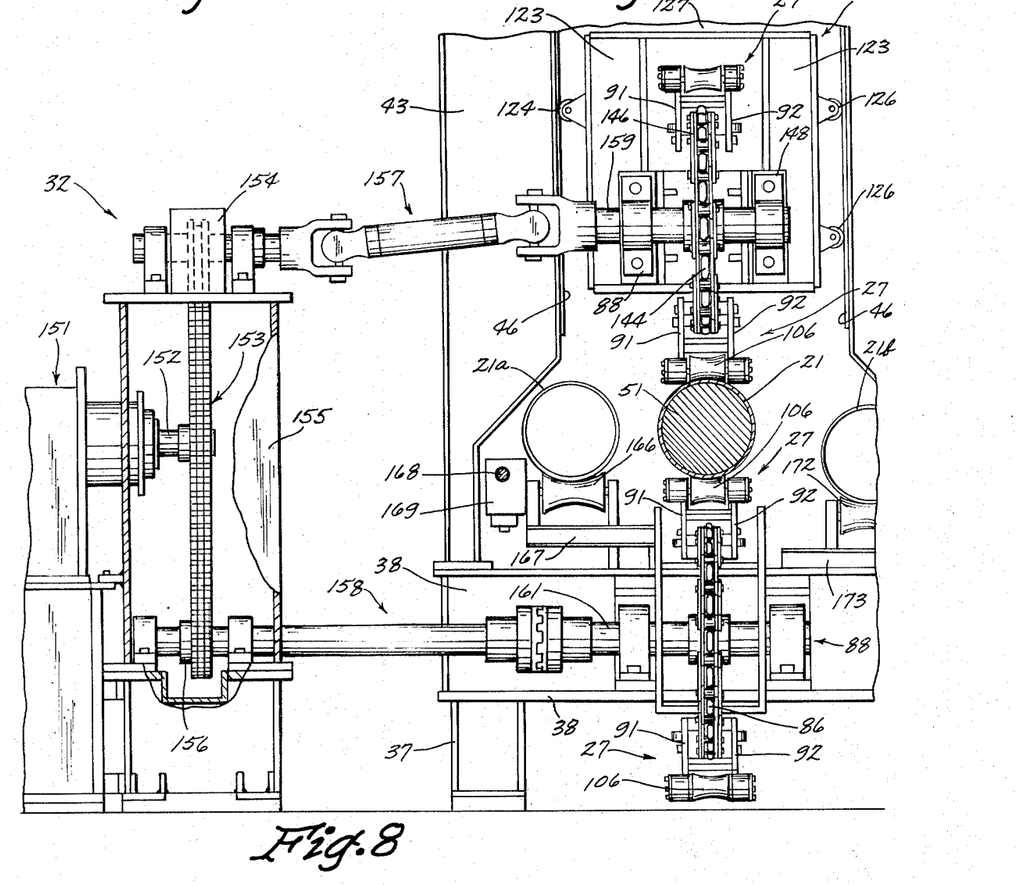
FIG. 8 is an elevational view of the burnishing machine at the driving end thereof as taken along the line 8—8 in 1, and showing a portion of the drive housing cut away for clarity of illustration.

Referring particularly to FIGS. 2 and 8, the drive unit 32 for the upper and lower burnishing assemblies 31 and 26, respectively, comprises any conventional power source indicated generally at 151 in FIG. 8, and having an output shaft 152 which imparts drive to a series of sprockets and chains indicated generally at 153 for driving the upper and lower drive block devices 154 and 156, respectively, each mounted on a frame work 155. From the upper and lower drive devices 154 and 155, respective drive transmission units 157 and 158 are provided, with the upper drive transmission unit 157 having a universal coupling arrangement to provide for the vertical movement of the secondary frame assembly 28. From the upper and lower drive transmission units 157 and 158, drive is then transmitted to respective drive shafts 159 and 161 for the upper and lower front mounting blocks 148 and 88, respectively, for the upper and lower burnishing assemblies 31 and 26, respectively (See FIG. 3).

Figure 9:
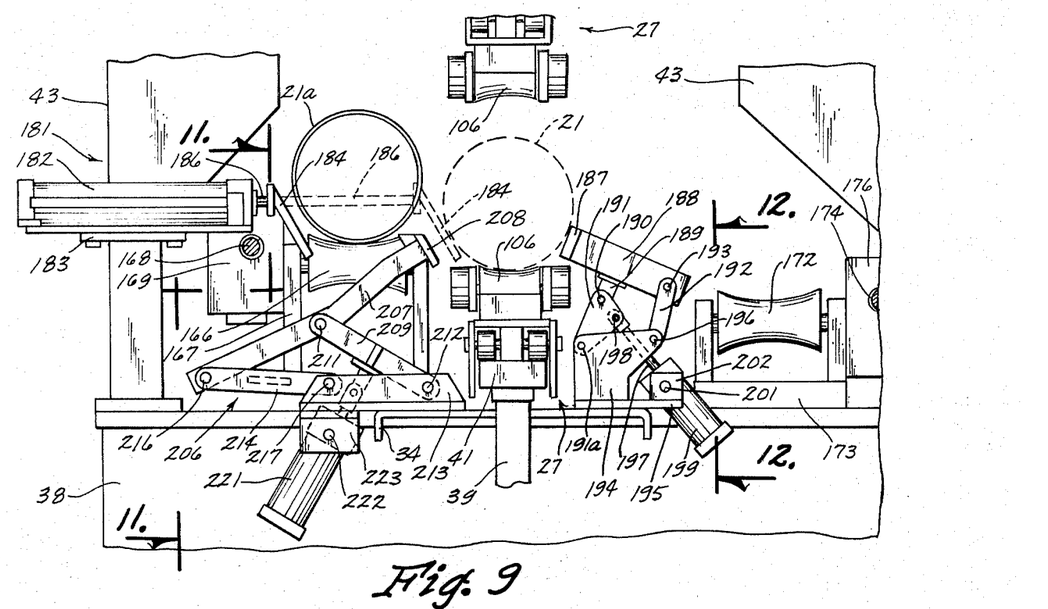
FIGS. 9 and 10 are elevational views taken transversely across the machine and showing the structure, and operation thereof by the use of dotted lines, for moving a tube laterally across the machine.

Referring to FIGS. 2 and 4, the input conveyor mechanism is illustrated generally at 164 and includes a plurality of transversely mounted rollers 166 spaced longitudinally along one side of the machine 20, the rollers 166 being mounted for rotation on a horizontal axis in a frame work 167 that also extends along the left side of the machine as illustrated in FIG. 9, wherein the frame work 167 is shown mounted on top of the box support 38. Each roller 166 receives drive from a line drive shaft 168 via a power take off housing 169 secured to the frame work 167 at each roller 166.

The discharge conveyor illustrated generally at 171 in FIGS. 2 and 4 also comprises like rollers 172 mounted in longitudinally spaced relation for rotation about a transverse, horizontal axis in a frame work 173 which is mounted to the right side of the machine as best illustrated in FIG. 9, again mounted on top of the box support 38. The discharge rollers 172 are also provided power by a line drive shaft 174 which has a plurality of take off housing 176 provided at each roller 172, the housings 176 secured to the frame work 173. A source of power 176 (FIG. 2) is provided at one end of the line shaft 174.

Figure 10:
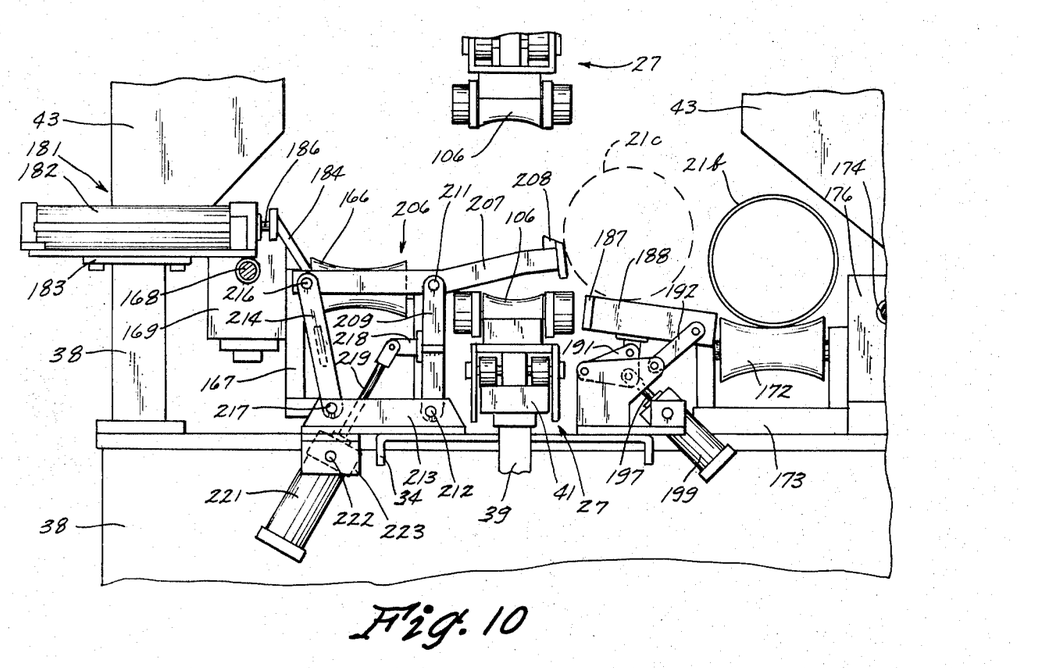

Referring to FIGS. 9 and 10, a tube 21a is illustrated in an input position on top of the input rollers 166, which tube 21a is then movable to a position illustrated at 21 in FIG. 9 directly between the upper and lower burnishing assemblies 31 and 26 (FIG. 3) respectively, and subsequent to the burnishing operation, the tube 21 is movable to a discharge position best illustrated in FIG. 10 by the numeral 21b, wherein the tube rests upon the discharge rollers 172 for discharge from the machine 20. The operation of this structure will be described more in detail hereinafter.

To move the tube from the input position 21a to the burnishing position 21, apparatus illustrated generally at 181 in FIGS. 9–12 inclusive is provided. The apparatus 181 comprises a plurality of hydraulic cylinders 182, each mounted in a horizontal position as best illustrated in FIGS. 2 and 9 by mounting bracket 183 on the side of each member 43. Each cylinder 182 has a rod 186 which is extendible toward and away from the center of the machine, with each rod 186 carrying an angularly depending plate 184 for engaging the tube 21a. Upon engagement of the tube 21a by the plurality of plates 184, all moving from outwardly of the machine toward the longitudinal center thereof, it can readily be appreciated that the tube 21a is rolled over and onto the burnishing units 27 of the lower burnishing assembly 26 as best illustrated in FIG. 9.

Figure 12:
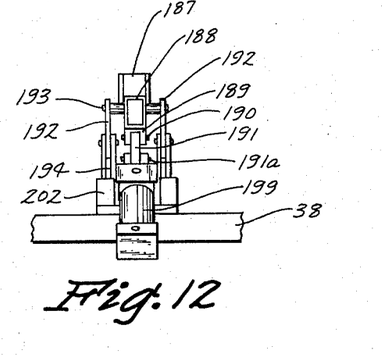
FIG. 12 is a vertical view as seen along the line 12—12 in FIG. 9.

The burnishing position apparatus 181 also includes a combination backstop and ramp unit best illustrated on the right side of FIGS. 9 and 10, and in FIG. 12. This arrangement includes a backstop bar 187 secured at the inner end of a ramp member 188, which ramp 188 has a lower ear 189 secured by a pin 190 to one corner of a triangular pivot plate 191. The plate is pivotally connected by a pin 191a to a corner of a pair of parallel mounting brackets 194 which are secured by a base 195 to the transverse box support 38 of the frame assembly 22. A pair of lengths 192 are pivotally connected by a pin 193 to the outer end of the ramp 188, and which lengths 192 are in turn pivotally connected by a pair of pins 196 to another portion of the mounting brackets 194. For moving the articulated structure, a piston rod 197 pivotally connected by a pin 198 to the triangular plate 191 is extendible from a hydraulic cylinder 199 pivotally mounted at 201 to a pair of logs 202 also secured to the base 195.

Referring best to FIGS. 9 and 10, it can readily be appreciated that when the cylinders 182 are actuated to move the tube 21a from the input position to the center position 21, the backstop unit is in the position of FIG. 9 such that the plurality of backstop bars 187 mounted in longitudinally spaced relation along the machine act to locate the tube 21 in its center position for burnishing. Subsequent to this, and of course in timed sequence with the remainder of the operation of the machine, the backstop ramp 188 is lowered by action of the cylinder 199 to the position of FIG. 10 wherein the member 188 literally acts as a ramp to enable movement of the tube 21 through the position of 21c to the discharge position 21b on top of the discharge rollers 172.

Figure 11:
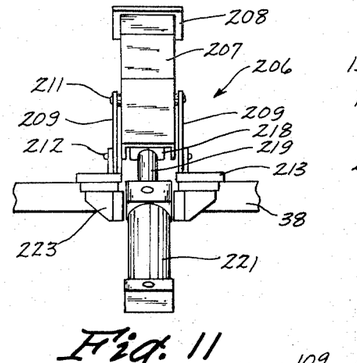
FIG. 11 is a vertical view as seen along the line 11—11 in FIG. 9.

The mechanism for moving the tube 21 to the discharge position 21b is indicated generally at 206 in FIGS. 9, 10 and 11. This structure includes an elongated push bar 207 (FIGS. 10 and 11) which has a pad 208 secured to the inner end thereof for engaging the tube 21. A pair of lengths 209 are pivotally connected at 211 at their upper ends to the sides of the push bar 207, and are also pivotally connected at 212 at their lower ends to a bracket 213 mounted on the box support 38 of the frame assembly 22. At the outer end of the push bar 207 another pair of lengths 214 are pivotally connected at 216 and 217 between the push bar 207 and the bracket 213 for providing a parallel linkage arrangement between the push bar 207 and the bracket 213. Movement of this structure is provided by a connection 218 being secured between the lengths 209, and pivotally connected by a rod 219 to a hydraulic cylinder 221 which in turn is pivotally connected at 222 to a pair of logs 223 also secured to the bracket 213. A plurality of these units 206 is provided along the machine for simultaneous actuation to push the tube 21 to the discharge position 21b (FIG. 10).

The machine 20 is adapted for automatic operation by conventional hydraulic and electric connections of the structure specifically illustrated herein, a control console (not shown) being provided for an operator who is in constant surveillance of the machine. A tube available for burnishing processing is inserted into the machine 20 by operation of the input conveyor 164, the rollers 166 (FIG. 2) being rotated so as to bring the tube 21a into the FIG. 9 position, locating the tube longitudinally of the machine such that the leading end 226 (FIG. 1) thereof is located opposite the clamp device 24.

The indexing apparatus 181 (FIG. 9), normally in its retracted position as shown in full lines in FIG. 9, is extended to the dotted line position such that by operation of all cylinders 182 the tube 21a is positioned in the center of the machine as illustrated at 21 in dotted lines in FIG. 9. To aid in locating the tube 21 in its center position, the backstop bars 187 of that plurality of units are in their raised positions also as illustrated in FIG. 9. When the tube 21 is properly located intermediate the upper and lower burnishing assemblies 31 and 26, respectively, both the indexing plates 184 and the backstop bars 187 are retracted to their positions best illustrated in FIG. 10. It is also to be noted that the discharge articulated mechanism illustrated generally at 206 in FIGS. 9 and 10 is in its lowered position of FIG. 9 so as not to interfer with movement of the tube from the 21a position to the 21 position.

The clamp device 24 is then actuated to close the clamping jaws 66 and 67 (FIG. 6) to engagement with the leading end 226 (FIG. 1) so as to retain the tube 21 substantially longitudinally stationary within the machine 20. In this condition of the tube, the mandrel 51 which has been held in a retracted condition by the cart 52 as best shwon in FIG. 3, is rammed home into the tube 21 at a rate of approximately 10 feet per second until the tube 21 has fully engaged the inner periphery of the clamping jaws 66 and 67 so as to prevent further rearward movement of the tube 21 in a direction oppositely that of its input movement into the machine 20. Continuous rearward force is directed against the mandrel 51 by the cart 52 until the mandrel itself cannot move further due to its successfully seeking the inner periphery of the tube 21. The clamping jaws 66 and 67 (FIG. 6) are then retracted.

The pressure moving units 29 (FIG. 4) are then hydraulically operated simultaneously to force all the secondary frame assemblies 28 and the upper burnishing assembly 31 which they carry, downwardly until the burnishing units 27 carried on the lower train of the upper chain 146 (FIG. 8) engage the upper surface of the tube 21, which pressure is continued until the burnishing units 27 apply pressure to the upper surface of tube 21 as well as the bottom surface of tube 21 through the mandrel 51. The pressure units 29 (FIG. 4) are adapted to attain a certain pressure setting, depending upon the size and taper of the tube 21 being burnished, such that approximately ⅛–¼ inch of compression is placed upon the springs 116 (FIG. 14) of all of the burnishing units 27 in contact with the upper and lower surfaces of the tube 21. It should also be noted as best illustrated in FIG. 5, that the respective burnishing units 27 of the upper and lower assemblies 31 and 26 which are in contact with the tube 21 are of diametrically opposed.

Operation of the drive unit 32 then rotates the driving sprockets 144 and 86 (FIG. 3) of the upper and lower burnishing units such as to rotate their respective chains and attached burnishing units 27 at identical rates of rotation to maintain the burnishing units 27 in the lower and upper trains, respectively, opposite each other again as was noted with respect to FIG. 5. Simultaneously, operation of the mandrel cart 52 results in rotation of the mandrel 51 so as to rotate the tube 21. Therefore, as the tube is contacted by the burnishing rollers 106 of the burnishing units 27 above and below the tube 21, it is also rotated by the mandrel 51. After approximately one half of the tube 21 is rotated, or — putting it another way, after the tube 21 rotates approximately 180°, the entire tube 21 is burnished. The pressure units 29 are again actuated to lift the secondary frames 121 upwardly, the rollers 124 and 126 rotating against their plates 46 to accomplish same, such that all pressure is removed from the now burnished tube 21.

To separate the tube 21 from the mandrel 51, the cart 52 is moved to the left as viewed in FIG. 3 whereupon the leading end 226 (FIG. 1) of the tube 21 engages a lip 233 (FIG. 3A) of a plate 228 which has been moved upwardly from a lowered, flush position within an enclosure 227. The plate 228 is movably connected to the piston 232 of a cylinder 229 secured to a block 231 affixed to a portion of the enclosure 227. The lip 233 stops the tube 21 from further movement while the mandrel 51 is completely withdrawn from the tube 21 by the cart 52.

Referring to FIGS. 9 and 10, the discharging apparatus 206 is then moved from its FIG. 9 position to the FIG. 10 position whereby the plurality of push bars 207 push the tube 21 across the ramps 188 through the 21c position to the 21b position of FIG. 10. As the discharge rollers 172 are continually being rotated by operation of their line drive shaft 174, the tube 21b is immediately removed from the machine 20 to another location (not shown) for purposes of inspection. With retraction of the articulated discharge apparatus 206 (FIG. 10) to the FIG. 9 position, and with movement of the backstop ramps 188 to their raised positions of FIG. 9, the machine 20 is again in position to repeat the aforementioned operation.

It is of course possible that while a tube 21 is being burnished, another tube 21a is positioned in the machine 20 for movement into the 21 position as soon as the tube 21 is moved to the discharge position 21b.

We claim

1. A machine for burnishing a hollow tapered tube, comprising in combination:

frame means;

first burnishing means movably mounted on said frame means for movement simultaneously in both a vertical plane and a horizontal plane;

secondary frame means movably mounted on said frame means;

second burnishing means movably mounted on said secondary frame means for simultaneous movement both in a vertical plane and a horizontal plane;

said first burnishing means and said second burnishing means each including an endless chain rotatably mounted on a pair of horizontally spaced sprockets, said sprockets mounted for rotation about horizontal, parallel axes, whereby said chain is moved through both a vertical plane and a horizontal plane as it rotates about said sprockets;

pressure means mounted on said frame means for moving said secondary frame means and said second burnishing means toward engagement with the tube, and operable to press the tube into engagement with said first burnishing means;

drive means for operating said first and second burnishing means; and mandrel means for releasably holding the tube between said first burnishing means and said second burnishing means.

2. A machine as defined in claim 1, and including further means for conveying said mandrel means longitudinally of said first burnishing means and said second burnishing means and into and out of engagement with the tube.

3. A machine as defined in claim 2, and further wherein said secondary frame means has a longitudinal axis lying normally in a horizontal plane but which axis is movable out of said horizontal plane in response to action of said pressure means on said secondary frame means.

4. A machine as defined in claim 3, and including further means for drawing the tube into the machine, means for moving the tube to a position directly between said first burnishing means and said second burnishing means, and means for moving the tube to a discharge position.

5. A machine as defined in claim 3, and wherein said drive means includes two vertically spaced pairs of horizontally spaced driven sprockets, and wherein each of said first burnishing means and said second burnishing means includes an endless chain trained about each pair of said sprockets, and further wherein a plurality of burnishing units are fastened in longitudinally spaced relation to each chain and are operable to engage the tube.

6. A machine as defined in claim 5, and wherein said mandrel means is operable to rotate the tube about its longitudinal axis simultaneously with movement of said endless chains carrying said burnishing units.

7. A machine as defined in claim 6, and further wherein said means for moving said secondary frame means includes a plurality of hydraulic cylinder units connected to said frame means, and further wherein said burnishing units each include a roller spring-biased into engagement with the tube.

8. A machine as defined in claim 7, and further wherein said mandrel means is movable in one direction into engagement with the tube for locating said tube in a stationary position longitudinally of the machine, and wherein direction of movement of said burnishing unit against the tube tends to move the tube in an opposite direction toward the said mandrel means.

9. A machine as defined in claim 8, and further wherein each burnishing unit engaging said tube from above is complemented by a burnishing unit engaging said tube from diametrically below.

* * * * *